(12) United States Patent
Gremo et al.

(10) Patent No.: US 7,181,007 B2
(45) Date of Patent: Feb. 20, 2007

(54) FLAT-PROFILE KEYPAD ASSEMBLY AND LABEL

(75) Inventors: Christopher S. Gremo, Algonquin, IL (US); Rachid M. Alameh, Crystal Lake, IL (US); Thomas E. Gitzinger, Jr., Palatine, IL (US)

(73) Assignee: Motorola Inc., Schaumburg, IL (US)

( * ) Notice: Subject to any disclaimer, the term of this patent is extended or adjusted under 35 U.S.C. 154(b) by 198 days.

(21) Appl. No.: 10/245,180

(22) Filed: Sep. 17, 2002

(65) Prior Publication Data
US 2004/0053648 A1   Mar. 18, 2004

(51) Int. Cl.
H04M 1/00 (2006.01)
H04M 9/00 (2006.01)
H04M 3/00 (2006.01)

(52) U.S. Cl. .............. 379/433.07; 455/575.1; 379/368

(58) Field of Classification Search .......... 379/368, 379/433.07, 433.06, 433.01; 455/575.1, 455/90.3; 200/317; 345/102, 168, 169, 345/170, 173
See application file for complete search history.

(56) References Cited

U.S. PATENT DOCUMENTS

| 4,449,024 | A | * | 5/1984 | Stracener ................. 200/317 |
|---|---|---|---|---|
| 5,077,832 | A | | 12/1991 | Szcutkowski et al. |
| 5,153,590 | A | | 10/1992 | Charlier |
| 5,555,550 | A | | 9/1996 | Kaschke |
| 5,703,625 | A | | 12/1997 | Snider et al. |
| 5,708,428 | A | | 1/1998 | Phillips |
| 5,747,756 | A | | 5/1998 | Boedecker |
| 5,940,015 | A | * | 8/1999 | Thornton et al. ........... 379/368 |
| 6,011,961 | A | | 1/2000 | Kaschke |
| 6,026,283 | A | * | 2/2000 | Stephenson .............. 455/575.1 |
| 6,148,075 | A | | 11/2000 | Inubushi et al. |
| 6,322,229 | B1 | | 11/2001 | Chan et al. |
| 6,911,608 | B2 | * | 6/2005 | Levy .......................... 200/5 A |
| 2003/0043120 | A1 | * | 3/2003 | Han ............................ 345/168 |

* cited by examiner

*Primary Examiner*—Benny Quoc Tieu
(74) *Attorney, Agent, or Firm*—Brian M. Mancini; Randall S. Vaas

(57) ABSTRACT

A keypad apparatus includes a printed circuit (110) configured for a keypad. Dome actuators (108) are placed on top of the printed circuit. A backlight (106) with apertures (103) is placed over the dome actuators such that the dome actuators rest entirely within their associated apertures. This assembly is covered with a retainer (104) placed on top of the backlight to form a flat-profile keypad that can be used on an exterior of a phone housing (112). The retainer can be labeled to define the key functions, or a preferred replaceable key label (102) can be placed over the retainer. This provides an integral assembly with key labels that are easily customized.

18 Claims, 2 Drawing Sheets

FLAT-PROFILE KEYPAD ASSEMBLY AND LABEL

FIELD OF THE INVENTION

The present invention relates generally to user interfaces. More particularly the present invention is directed to a keyboard apparatus.

BACKGROUND OF THE INVENTION

Typically, there are two types of keypads used in radiotelephones. In the first type of keypad, the keys are directly attached to the circuit board internal to the radiotelephone. In the second type of keypad, the keypad is a separate entity from the circuit board contained within the radiotelephone. The keypad and the circuit board are coupled together via wires. In either case, the keypad assembly takes up a significant volume of the radiotelephone, which is a disadvantage as the existing market trend is for smaller and smaller phones. As a reduction in size and increased requirement for design flexibility in radiotelephones becomes more prominent, efficient use of space become more important.

In the first type of keypad, the keypad utilizes a relatively large amount of space on the circuit board contained within the radiotelephone. Since the keypads interact directly with the circuit board, back-lighting each individual key is necessary because there is no use of reflective plates or light pipes, this increases the power consumption and makes the keypad more cumbersome.

In the second type of design, the keypad is separated from the circuit board internal to the radiotelephone except for the electrical coupling of the keypad circuitry to the circuit board. For example, a keypad containing twenty-four keys requires approximately thirteen wires plus the wiring for the backlighting circuitry. This second type of keypad supports backlighting with reflector plates or light pipes, which reduces the number of LEDs necessary to backlight a keypad. This second type of keypad also supports the use of conductive/resistive inks that allow circuits to be inked onto materials other than circuit boards themselves such as thermal plastics. However, the total size of the assembly is still bulky.

Moreover, in both cases the keys and key labels are fixed. Therefore, if a phone is to be configured to have Chinese language characters on the keys, then a complete change of keys are needed. This cannot be easily accomplished in the field, and is more suited to proper configuration at the factory. Along these lines, an end user cannot make cosmetic changes in the appearance in the keypad assembly if desired.

Although the two preceding designs have served the industry well to this point, the need exists for a keypad which is more efficient in the use of space. It would also be of benefit if the assembly allowed customizing or changing of the key labels in the field, or at the point of sale, without disassembly of the keypad thereby maintaining keypad integrity. It would also be an advantage to provide a lighted, low-profile solution while maintaining a low cost.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

The present invention provides a flat, low-profile keypad assembly which is more efficient in the use of space. The assembly allows easy customizing or changing of the key labels by means of a customizable label covering on top of the assembly. This is accomplished in a low-cost, back-lighted, low-profile solution, and can be configured substantially as a standard keypad or custom keypad by changing the label. Preferably, the label also includes an integral decorative element.

A novel aspect of the present invention is using an electroluminescent lamp for the backlighting and for holding the keypad actuator with the printed circuit. Specifically, the actuators are coplanar with the backlight to provide a low-profile assembly. This provides illumination of the keypad without adding additional layers that are required in traditional keypads (i.e. light pipes and reflectors), and results in a flat assembly. A printed circuit is included in an integral keypad assembly that is disposed on the outside of a radiotelephone housing. The placement of the keypad assembly on the exterior of the housing of the phone reduces mechanical stress to main logic board within the phone. Another novel aspect is providing a keypad label that can be customized by the end user for either or both of decoration and functionality.

Figure 1:
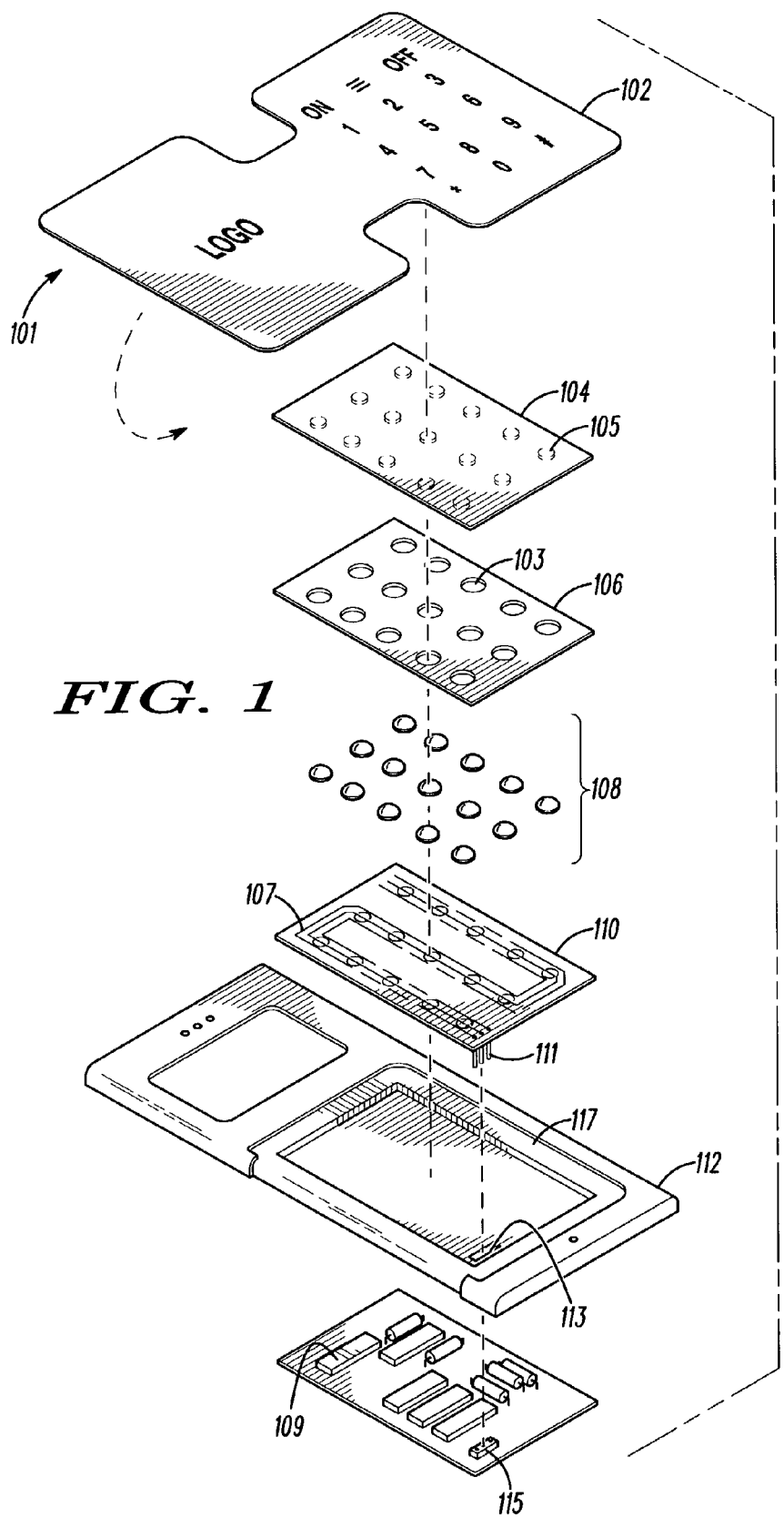
FIG. 1 is an exploded view of a keypad assembly coupled to a radiotelephone, in accordance with the present invention.
Figure 2:
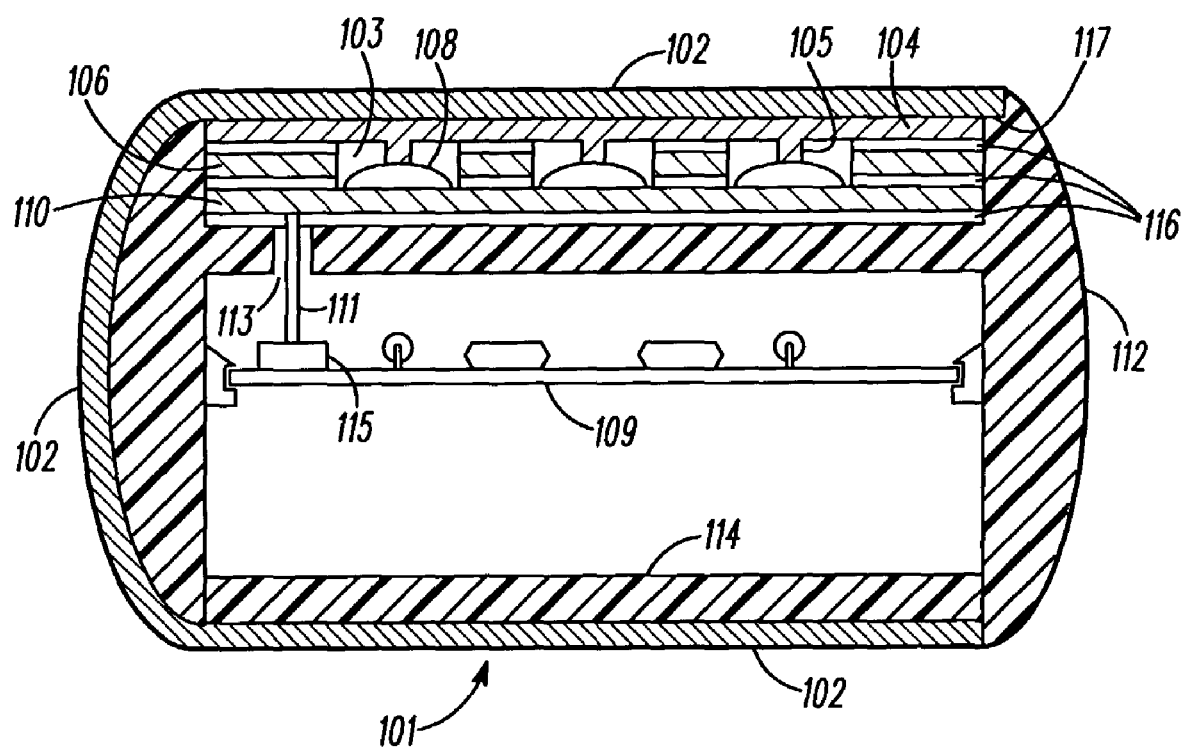
FIG. 2 is a cross-sectional view of the assembled keypad apparatus of FIG. 1.

FIGS. 1 and 2 show a back-lit keypad assembly, in accordance with the present invention. The keypad assembly itself includes a printed circuit 110, at least one actuator 108, a backlight 106, a retainer 104 for retaining the actuators 108, and a label 102. In a preferred embodiment, the printed circuit, backlight, and retainer are affixed together to form an integral assembly. In practice, the keypad assembly is mounted to a radiotelephone housing 112 and electrically connected to circuitry 109 within the radiotelephone housing 112. These connections can be accomplished in many ways. For example, and as shown, the printed circuit 110 can include a plurality of pins 111 that connect, through an opening 113 in the housing 112, to a receptacle 115 coupled to the radio telephone circuitry 109. It should be recognized that many other techniques can be used to accomplish this purpose, and fall within the scope of the present invention.

Preferably, the label 102 contains a decorative feature 101, and it is customizable and replaceable. The decorative element 101 is typically used to provide a decoration 101 on the housing of the radiotelephone such as is shown on a rear portion 114 of the housing in FIG. 2, for example. However, it should be recognized that the decorative portion 101 can be located anywhere on the label, and correspondingly anywhere on the radiotelephone housing, including the labeled key area itself.

The keypad assembly is based on the printed circuit 110, which is used to detect keypad operation. Although a fifteen key keypad assembly is shown as an example, it should be obvious that the present invention is adaptable to any amount of keys, including a full QWERTY keyboard, if desired. The printed circuit essentially is a logical keypad matrix that indexes every key that the radiotelephone has.

The printed circuit has a connector 111 to connect the matrix to the logic circuitry 109 inside the radiotelephone through a hole 113 in the housing 112. The printed circuit 110 is adhered to the outside housing 112 to prevent it from moving when keys are pressed. Preferably, a flexible connection 111 is made between the printed circuit 110 and the main logic board 109 inside the housing 112 to further reduce the chance of damaging the main board electronics by pressing the keys too firmly.

The printed circuit 110 consists of conductive wires or traces 107 disposed on a top surface of a printed circuit board or flexible circuit. The conductive traces 107 and used to complete a specific circuit when any particular key is actuated. Each key location has a land pattern on the conductive traces that is used to signal when a key is pressed. Completing the circuit relays a signal to the radiotelephone circuit 109 through the connections 111, 115, so that the radiotelephone can take the appropriate action associated with that keystroke. The particular layout or configuration of the conductive traces 107 can be accomplished in many of the various ways that are known in the art. The conductive traces 107 can be applied to a standard circuit board or it can be inked onto the housing 112 itself. In this manner the housing 112 becomes the printed circuit 110. The use of printed conductive inks and resistive inks adds flexibility to the designing of this keypad. In this embodiment, the circuit is inked onto the housing 112, which allows the keypad assembly to be flexible in design and it frees up additional room on the circuit board 109 contained within the radio housing 112 so that additional circuits may be added to the circuit board 109 or the overall size of the circuit board 109 may be reduced. Optionally, an EMI/RFI shield can be added to either the printed circuit board 110 or housing 112 to reduce the amount of electromagnetic noise escaping from the radiotelephone.

Actuators 108 are assembled on top of the printed circuit in proximity to the conductive traces thereof. The actuators are tactile dome switches placed over the land patterns on the conductive traces 107 of the printed circuit 110. The actuators provide the tactile feedback and shorting mechanism for signaling a key press. Tactile dome switches come in various sizes and deflection pressures to aid in controlling the tactile feedback to the user. To save space, individual actuator buttons are affixed or placed on top of the printed circuit. Alternatively, the actuators can be dimpled on to a continuous sheet affixed or placed on top of the printed circuit 110, although this would add unnecessary height to the total assembly. If the buttons or sheet are to be affixed to the printed circuit, a standard adhesive 116, as is known in the art, can be used. Alternate affixing techniques can also be used successfully, such as ultrasonic welding for example. Each of the actuator buttons includes a conductive portion for electrically contacting the conductive traces to complete the associated circuit on the land patterns of the circuit board when the actuator is mechanically actuated by being depressed. Preferably, the actuators are made of a conductive material such as metal for this purpose, although other conductive or semi-conductive materials can be used. In addition, a conductive pill can be affixed beneath the dome of each actuator for this purpose. However, this would also unnecessarily add to the height of the total assembly.

It is envisioned that the dome of each actuator button can also have reflective properties to redirect some of the light from the backlight 106 upwards. To provide proper travel to the tactile dome switches the retainer and actuator needs to be spaced away from the printed circuit.

The backlight 106 includes top and bottom major surfaces with at least one aperture extending therethrough. There is an aperture 103 for each associated actuator 108. Preferably, the backlight is an electroluminescent lamp. This eliminates the need for light pipes and reflecting surfaces to guide the light generated from light emitting diodes. Therefore, the backlight serves to provide adequate actuator spacing to provide proper travel to the tactile dome switches, while also providing illumination of the keyboard without adding additional layers required in prior art keypads. More preferably, a segmented lamp can be used to provide selected lighting effects for the keypad assembly. Segmenting can be used to control lighting of specific areas of the keypad. By segmenting the lamp, user feedback can be increased and current consumption can be reduced versus lighting the entire keypad. Reflected LEDs or lightpipes could be used, but there would be a height penalty. The backlight 106 can be directly affixed to the printed circuit 110 with an adhesive 116, if desired, or held in place by the overlying layers. The backlight 106 is positioned over the actuators 108 and printed circuit 110 such that the actuators 108 are co-located with the apertures 103. In other words, the actuator 108 rests entirely within the top and bottom major surfaces of the backlight that define the aperture 103. This provides for a very low-profile keypad assembly.

The retainer 104 is placed on top of the backlight 106 and is used to hold the actuators 108 in place in each aperture 103. The retainer also serves to mechanically actuate each actuator. The retainer includes substantially transparent portions to let through light from the backlight 106. These transparent portions would typically include the area over the actuators, but can include other portions or the entire retainer itself. If the actuators 108 are of a lower profile than the backlight 106, then the retainer can include projections 105 on a bottom surface thereof to mechanically contact the actuators 108 when the retainer 104 is assembled on top of the backlight 106. These projections would then serve to mechanically actuate each actuator. These projections also act to focus a key press to the center of the dome. This provides better tactile feedback to a user. Preferably, these projections 105 are transparent. The projections 105 can affixed to the retainer 104 or be an integral portion thereof, such as can be accomplished through a molding process.

The label 102 defines the user interface to the keypad assembly and is disposed on top of the retainer 104. The label is printed on a top surface thereof with numbers, letters, or icons entering data or information or for identifying particular key functions of the radiotelephone. In its most basic form the labeling is configured the same as a standard telephone keypad. The label 102 and the retainer 104 can be an integral, unitary (i.e. the same) assembly to save height. Additionally, the label (and retainer) can be flexible or rigid. For example, a rigid label (and retainer) can be used to hold in the keypad assembly layers (when not affixed together) against the housing by means of tabs and locks. Preferably, the label is a thin, flexible sheet with substantially transparent portions to let through light from the backlight to light up the printed labeling. This flexible label would have a thin adhesive backing to affix the label to the radiotelephone housing. As such the label would be easily replaceable if a non-permanent adhesive is used. Of course, such a label can be readily customized by printing the key labeling as desired. More preferably, the label 102 includes an extended wraparound portion that includes a decorative feature 101 printed thereon. When installed on a radiotelephone the label identifies key functions on top of the radiotelephone as well as a decoration on the radiotelephone. Such decoration can be chosen by an end user to modify the appearance of the radiotelephone. For example, the decorative feature can be a favorite sports team logo. The decorative feature can be anywhere on the label including the keypad region. Optionally, the housing 112 can include a step 117 to provide for easy alignment of the label 102 on the housing 112.

In practice, the label is wrapped over the keypad assembly's laminated stack up and also around the phone, as shown in FIG. 2. Since the label has no functionality other than identification and decoration it can be placed on the radiotelephone at any time during the manufacturing process. The label could also be replaceable by the end user to make the phone even more definable and customizable. Colored transparent inks can be used to illuminate areas which require color specific icons or details (i.e. send and end labels). In addition, the labeling can be modified to change languages or features. For example, the keypad functionality could be changed through a software download. A corresponding keypad label can then be printed to affix to the radiotelephone to correctly identify the corresponding key functions. Off-the-shelf software and labeling packages could be purchased that conform to the specific radiotelephone model owned by a user. The software could also be downloadable and used with a preformed label package for the specific radiotelephone model.

It is envisioned that the label could be affixed to the specific radiotelephone model at four different times. First, the label can be placed on the phone at the time the phone is manufactured. Second, the label could be placed on the phone during distribution, before shipment to a service provider. Third, the label could be placed on the phone by the service provider for a user at the time of purchase. Fourth, the user could replace the existing label after purchase using purchased or downloaded software and purchased labels, to create custom graphic labels for their phone.

While the invention has been described in detail above, the invention is not intended to be limited to the specific embodiments as described. It is evident that those skilled in the art may now make numerous uses, modifications of, and departures from the specific embodiments described herein without departing from the inventive concepts and broad scope of the present invention.

What is claimed is:

1. A thin flat-profile keypad assembly consisting essentially of:
   a printed circuit board having conductive traces disposed on a top surface thereof;
   a plurality dome actuators above the printed circuit board in proximity to the conductive traces of the printed circuit board, the dome actuators including a conductive portion for electrically contacting the conductive traces when the dome is mechanically actuated;
   a backlight having top and bottom major surfaces with apertures extending therethrough, the backlight positioned such that the dome actuators rest entirely within respective apertures in said backlight;
   a retainer with substantially transparent portions positioned above the backlight; and
   a label with substantially transparent portions disposed on top of the retainer, the label having key functions printed thereon.

2. The apparatus of claim 1, wherein the printed circuit, backlight, and retainer are affixed together to form an integral assembly.

3. The apparatus of claim 1, wherein the retainer includes projections on a bottom surface thereof, said projections for mechanically contacting said dome actuators.

4. The apparatus of claim 1, wherein the retainer and label are a unitary assembly.

5. The apparatus of claim 1, wherein the label includes an extended wraparound portion having a decoration printed thereon, when installed on a radiotelephone the label identifies key functions on top of the radiotelephone as well as covering another portion of the radiotelephone.

6. The apparatus of claim 1, wherein the label is configured to be replaceable.

7. The apparatus of claim 1, wherein the backlight is a segmented electroluminescent lamp.

8. A flat-profile keypad apparatus for a radiotelephone comprising:
   a printed circuit having conductive traces disposed on a top surface thereof, the printed circuit including a plurality of electrical connections, the electrical connections including contacts coupled to the circuitry within the radiotelephone housing;
   a plurality of individual respective dome actuators positioned on top of the printed circuit in proximity to the conductive traces of the printed circuit, each of the dome actuator including a conductive portion for electrically contacting respective conductive traces when each of the dome actuators is mechanically actuated;
   a backlight having top and bottom major surfaces with a apertures extending therethrough, the backlight positioned around each of the dome actuators such that each of the dome actuator rests entirely within an aperture;
   a retainer with substantially transparent portions positioned on top of the backlight, the retainer configured to mechanically contact and actuate each of the dome actuators;
   a label with substantially transparent portions disposed on top of the retainer, the label having key functions printed thereon; and
   wherein the keypad apparatus is disposed on an exterior of the housing.

9. The apparatus of claim 8, wherein the printed circuit, backlight, and retainer are affixed together to form an integral assembly.

10. The apparatus of claim 8, wherein the retainer includes at least one projection on a bottom surface thereof, the at least one projection for mechanically contacting the at least one dome actuator.

11. The apparatus of claim 8, wherein the retainer and label are a unitary assembly.

12. The apparatus of claim 8, wherein the label includes an extended wraparound portion having a decoration printed thereon, when installed on a radiotelephone the label identifies key functions on top of the radiotelephone as well as a decoration on the radiotelephone.

13. The apparatus of claim 8, wherein the label is configured to be replaceable.

14. The apparatus of claim 8, wherein the backlight is a segmented electroluminescent lamp.

15. A radiotelephone operable in a communication system, the radiotelephone including a flat-profile keypad assembly with an additional decorative function, the radiotelephone comprising:
   a housing with circuitry disposed therein;
   a well on an exterior of said housing;
   a printed circuit being affixed to said exterior of the housing in said well, a bottom wall of said well supporting the printed circuit, the printed circuit having conductive traces disposed on a top surface thereof, the printed circuit including a plurality of electrical connections, the electrical connections include contacts coupled to the circuitry within the radiotelephone housing;

a plurality of dome actuators placed to the top of the printed circuit in proximity to the conductive traces of the printed circuit, each of the dome actuators including a conductive portion for electrically contacting the conductive traces when each dome actuator is mechanically actuated;

a backlight having top and bottom major surfaces with a plurality of apertures extending therethrough, the backlight around said dome actuators such that said dome actuators extend within the aperture;

a retainer with substantially transparent portions is placed on top of the backlight, the retainer is configured to mechanically contact and actuate the at least one dome actuator; and a label with substantially transparent portions having key functions printed thereon and including an extended wraparound portion having a decoration printed thereon, the label affixed to the retainer with the key functions aligned thereon and wrapped around and affixed to the housing to provide the decoration on a rear wall of radiotelephone.

16. The apparatus of claim 15, wherein the retainer includes at least one projection on a bottom surface thereof, the at least one projection for mechanically contacting the at least one dome actuator.

17. The apparatus of claim 15, wherein the retainer and label are a unitary assembly having an adhesive thereon for securing the flat keypad assembly within the well.

18. The apparatus of claim 15, wherein the label adhesive removably secures the label over the keypad assembly.

* * * * *